US012096390B2

(12) United States Patent
Choi et al.

(10) Patent No.: US 12,096,390 B2
(45) Date of Patent: Sep. 17, 2024

(54) METHOD AND SYSTEM FOR CONTROLLING TRAFFIC IN PRIVATE NETWORK BASED ON MOBILE COMMUNICATION NETWORK

(71) Applicant: NTELS Co., Ltd., Seoul (KR)

(72) Inventors: Young Lae Choi, Seoul (KR); Jung Hoon Kim, Seoul (KR); Sang Kwon Han, Seongnam-si (KR)

(73) Assignee: NTELS Co., Ltd., Seoul (KR)

( * ) Notice: Subject to any disclaimer, the term of this patent is extended or adjusted under 35 U.S.C. 154(b) by 356 days.

(21) Appl. No.: 17/837,665

(22) Filed: Jun. 10, 2022

(65) Prior Publication Data

US 2022/0408392 A1   Dec. 22, 2022

(30) Foreign Application Priority Data

Jun. 16, 2021   (KR) ........................ 10-2021-0077790

(51) Int. Cl.
*H04W 60/00*   (2009.01)
*H04W 48/02*   (2009.01)
*H04W 64/00*   (2009.01)

(52) U.S. Cl.
CPC ........... *H04W 60/00* (2013.01); *H04W 48/02* (2013.01); *H04W 64/003* (2013.01)

(58) Field of Classification Search
CPC .... H04W 60/00; H04W 48/02; H04W 64/003
See application file for complete search history.

(56) References Cited

U.S. PATENT DOCUMENTS

| | | | | |
|---|---|---|---|---|
| 2021/0185012 A1* | 6/2021 | Kochhar | ................ | G06N 20/00 |
| 2022/0191112 A1* | 6/2022 | Gupta | ................ | H04W 84/045 |
| 2022/0408392 A1* | 12/2022 | Choi | .................... | H04W 60/00 |
| 2022/0417757 A1* | 12/2022 | Gupta | ................... | H04W 16/02 |
| 2023/0013356 A1* | 1/2023 | Vagelos | ............. | H04L 63/0272 |
| 2024/0147309 A1* | 5/2024 | Puma | .................... | H04W 28/24 |

FOREIGN PATENT DOCUMENTS

| | | | | |
|---|---|---|---|---|
| CN | 113259943 A | * | 8/2021 | ......... H04W 12/009 |
| JP | 7450974 B1 | * | 3/2024 | |

\* cited by examiner

*Primary Examiner* — Adam D Houston
(74) *Attorney, Agent, or Firm* — Paratus Law Group, PLLC

(57) ABSTRACT

A private network system based on a mobile communication network, includes: a packet data processing system of a mobile communication core network to which a user terminal is attached; a traffic management device configured to retain an attachment policy that is set in advance; and a packet analysis device, configured to receive a packet that requests network attachment from the packet data processing system, extract attachment information of the user terminal from the packet, and compare the attachment information with the attachment policy of the traffic management device to control intranet or Internet attachment. The attachment policy includes at least one of a whitelist defining a target whose traffic is allowed or a blacklist defining a target whose traffic is blocked, and the packet data processing system is included in a private network system that is not controlled by a control policy device of the mobile communication core network.

12 Claims, 5 Drawing Sheets

METHOD AND SYSTEM FOR CONTROLLING TRAFFIC IN PRIVATE NETWORK BASED ON MOBILE COMMUNICATION NETWORK

CROSS-REFERENCE TO RELATED APPLICATION

This application claims priority to Korean Patent Application No. 10-2021-0077790 (filed on Jun. 16, 2021), which is hereby incorporated by reference in its entirety.

BACKGROUND

The following description relates to a technology of controlling traffic in a private network based on a mobile communication network.

Companies or public offices provide certain services to members thereof through an intranet which is an internally used as a private network. Here, the private network corresponds to a system physically separated from a mobile communication network. When a private network is linked with a mobile communication network, a user can access the intranet through the mobile communication network.

Meanwhile, the mobile communication network can control traffic of the user based on a policy set in advance for the user accessing the core network.

SUMMARY

In a private network linked with a mobile communication network, control of user traffic needs to be operated separately from the policy of the mobile communication network. The following description is intended to provide a private network for controlling traffic using a control policy independent from a control policy of the mobile communication network. Further, the following description is intended to provide a private network that dynamically utilizes information of a user accessing a mobile communication network while controlling traffic using a control policy independent of that of the mobile communication network.

In one general aspect, there is provided a method of controlling traffic in a private network based on a mobile communication network, the method including: when subscriber identification information of a user terminal is registered in a mobile communication core network, registering, by a traffic management device, identification information of the user terminal to register the user terminal as a blacklist terminal or a whitelist terminal; attaching, by the user terminal, to the mobile communication core network; receiving, by a packet analysis device, a packet that requests network attachment for a specific service from a packet data processing system of the mobile communication core network and extracting attachment information of the user terminal from the packet, and comparing, by the packet analysis device, the attachment information with an attachment policy of the traffic management device that is set in advance to control intranet or Internet attachment.

In another aspect, there is provided a private network system based on a mobile communication network, the private network system includes: a packet data processing system of a mobile communication core network to which a user terminal is attached; a traffic management device configured to retain an attachment policy that is set in advance; and a packet analysis device configured to receive a packet that requests network attachment from the packet data processing system, extract attachment information of the user terminal from the packet, and compare the attachment information with the attachment policy of the traffic management device to control intranet or Internet attachment. The attachment policy includes at least one of a whitelist defining a target whose traffic is allowed or a blacklist defining a target whose traffic is blocked, and the packet data processing system is not controlled by a control policy device of the mobile communication core network.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1:
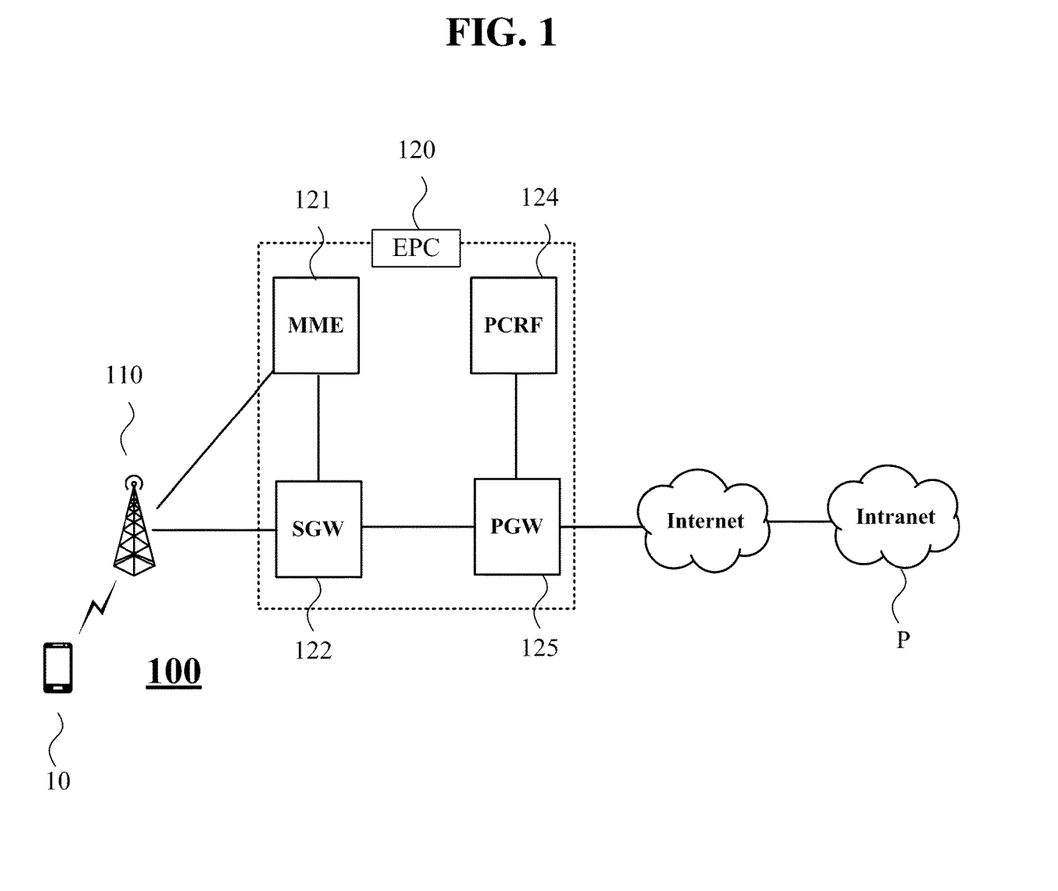
FIG. 1 is an example of traffic control in a conventional mobile communication network system.

FIG. 1 is an example of traffic control in a conventional mobile communication network system 100. FIG. 1 shows an example of a long-term evolution (LTE) system.

The user terminal 10 attaches to an evolved packet core (EPC) 120 that is a core system of a mobile communication network through a base station (eNB) 110. FIG. 1 illustrates some components of the EPC 120 required for description. A mobility management entity (MME) 121 performs session management and mobility management for the user terminal 10. A serving gateway (SGW) 122 transmits a data packet and serves as a handover reference point with a base station or other networks. A PDN Gateway (PGW) 125 is a component for connecting an external data network to the user terminal 10.

A policy and charging rules function (PCRF) 124 is a component that provides policy and charging based on a service and subscriber profile. The PCRF 124 corresponds to a component for controlling attachment to the user terminal 10 that attaches to the mobile communication network. Accordingly, the PCRF 124 is involved in traffic control according to a policy in the mobile communication network system 100.

According to the policy of the PCRF 124, the user terminal 10 may attach to the external Internet through the PGW 125. FIG. 1 illustrates a case of attaching to a private intranet P through the Internet. Accordingly, the user terminal 10 attaches to the intranet P via the mobile communication network system 100, and the intranet P provides a service according to information and a request of the attached terminal. Although the intranet P may control traffic of the user terminal 10, the traffic control is independent of the policy of the PCRF 124, and in this process, it is difficult to utilize internal information (RADIUS authentication information, etc.) of the mobile communication network.

Figure 2:
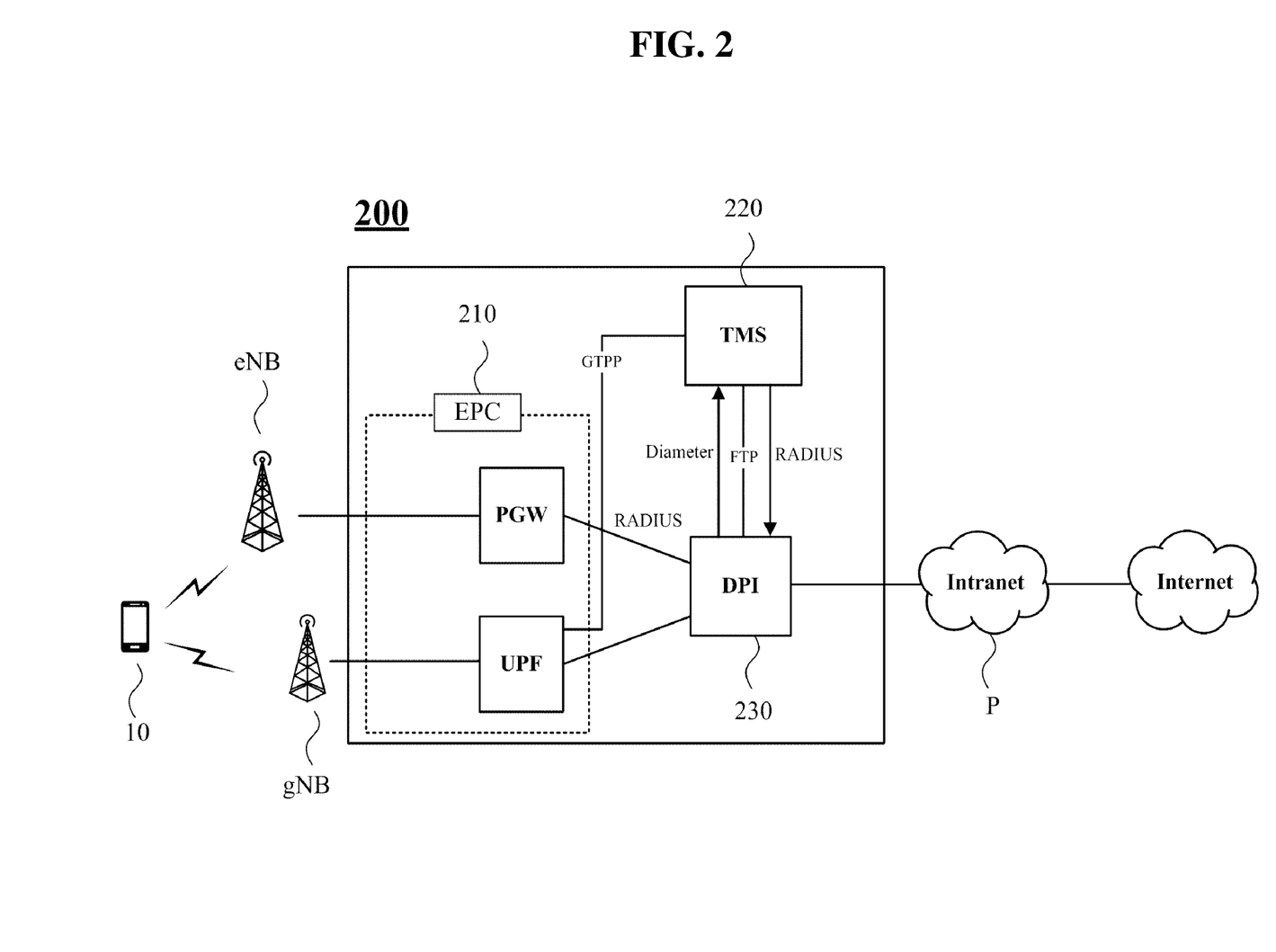
FIG. 2 is an example of traffic control in a private network system based on a mobile communication network.

FIG. 2 is an example of a private network system 200 coupled to a mobile communication network. In FIG. 2, the private network system 200 may control traffic in a private network on the basis of information about the user terminal 10 attached to the mobile communication network.

FIG. 2 is an example of traffic control in the private network system 200 based on the mobile communication network. The user terminal 10 may attach to a 4G or 5G mobile communication network. The user terminal may attach to the mobile communication network through an eNB or gNB.

The private network system 200 based on the mobile communication network includes an EPC 210, a traffic management system (TMS) 220 and a deep packet inspection (DPI) 230.

The user terminal 10 serving as a mobile communication subscriber corresponds to a device registered in advance in the EPC 210. FIG. 1 does not illustrate a component (e.g., a home subscriber server: HSS) for retaining information about the user terminal 10.

The EPC 210 corresponds to a core system of the mobile communication network. FIG. 2 illustrates only a PGW and a user plane function (UPF), which are packet data delivery components, required for description among components of EPCs. The PGW is a packet transmission gateway of a 4G mobile communication network, and the UPF corresponds to a packet transmission configuration of a 5G mobile communication network.

The TMS 220, which is a traffic management device, manages a policy for traffic control. The TMS 220 may receive certain information from the EPC 210. For example, the TMS 220 may be connected to the UPF with GPRS Tunneling Protocol Prime (GTPP).

The DPI 230, which is a packet analysis device, receives a packet from the PGW or UPF. For example, the DPI 230 may receive RADIUS generated when the user terminal 10 attaches to the mobile communication network from the PGW or UPF.

The DPI 230 receives a packet including information generated by the user terminal 10. The DPI 230 analyzes the received packet to extract attachment information and/or service information included in the packet. The attachment information corresponds to information generated when the user terminal 10 attaches to the mobile communication network. The service information includes information about a service requested from the intranet P by the user terminal 10. Furthermore, attachment information in a broad sense may be used as a meaning including information generated when the user terminal 10 attaches to a network, service information, and the like.

The DPI 230 may be connected to the TMS 220 through a predetermined protocol (e.g., file transfer protocol, FTP). For example, the DPI 230 may transmit Diameter information to the TMS 220, and the DPI 230 may receive RADIUS information from the TMS 220. The Diameter and RADIUS described above are protocols for transmitting authentication-related information in mobile communication, and are indicated in the drawings as referring to information transmitted through the corresponding protocol. For example, the authentication-related information may include user information, a location of a terminal, and the like. The private network system 200 based on the mobile communication network may use another protocol for exchanging information between the DPI 230 and the TMS 220.

The DPI 230 extracts attachment information from the packet and controls to allow or block the traffic of the user terminal 10 with reference to an attachment policy generated or transmitted by the TMS 220. The DPI 230 may use one of various types of attachment information or a combination of a plurality of pieces of attachment information as a reference for controlling traffic.

The DPI 230 may allow or block intranet attachment according to the attachment information of the user terminal 10 and the attachment policy. In addition, the DPI 230 may allow or block traffic made for a specific service using the Internet after the intranet attachment, according to the attachment information of the user terminal 10 and the attachment policy.

Figure 3:
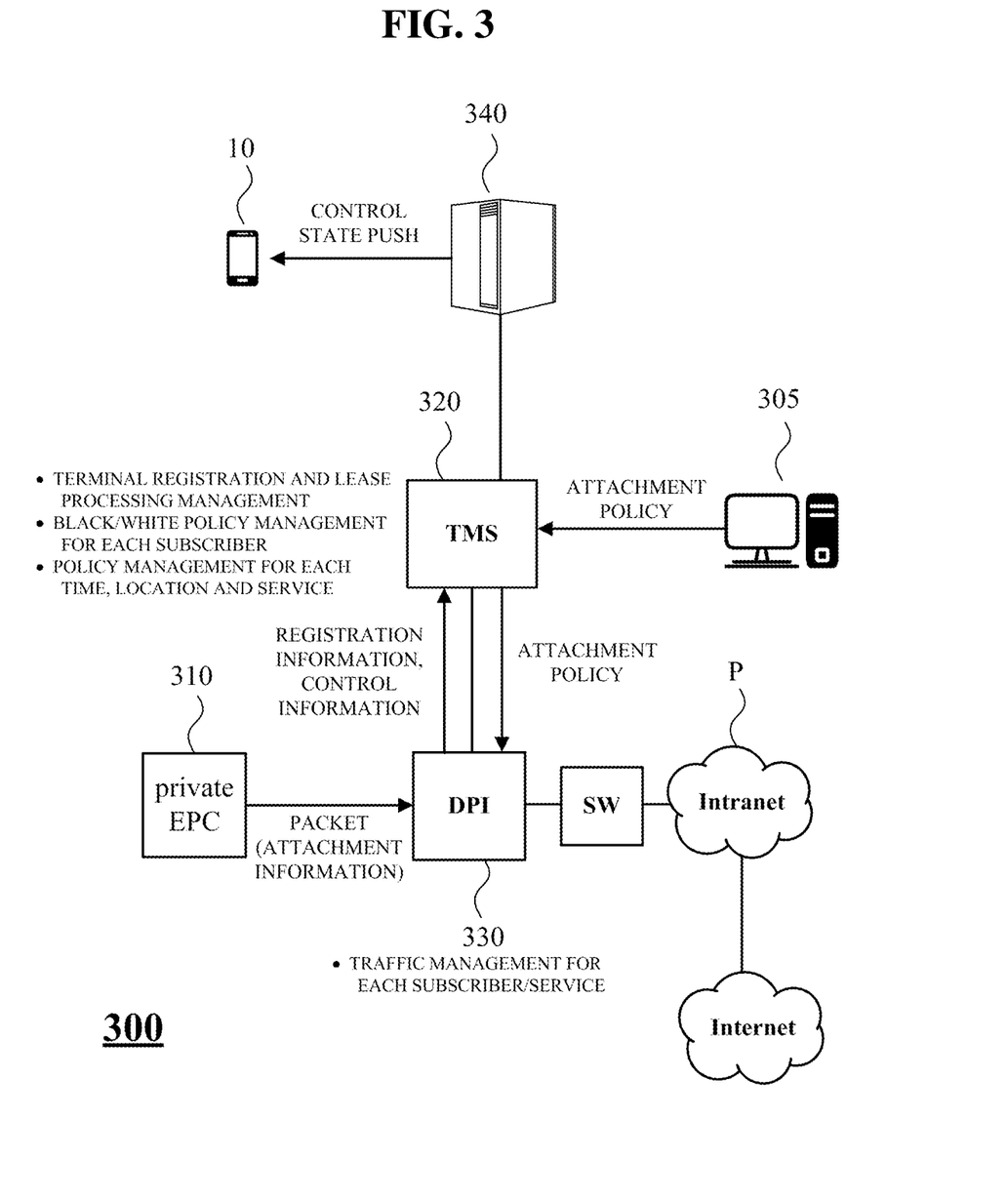
FIG. 3 is an example of a policy setting and control process in a private network system based on a mobile communication network.

FIG. 3 is an example of a policy setting and control process in a private network system 300 based on a mobile communication network. The private network system 300 based on the mobile communication network of FIG. 3 is a system corresponding to the private network system 200 based on the mobile communication network of FIG. 2. FIG. 3 further illustrates components required for setting an attachment policy, and the like.

The private network system 300 based on the mobile communication network includes an EPC 310, a TMS 320, a DPI 330, and a push server 340.

The EPC 310 corresponds to a core network system of the mobile communication network as described above. However, the private EPC 310 is an EPC dedicated to a specific company or institution using an intranet. That is, the private EPC 310 corresponds to a device allocated by a mobile communication network operator as a dedicated configuration of the private network system 300 of a specific company or institution.

The DPI 330 receives a packet including an attachment request or a service request of the user terminal from the EPC 310. The packet includes attachment information. The packet basically includes identifier information of the user terminal. The DPI 330 extracts attachment information from the packet.

When the user terminal is a subscriber of the mobile communication network, the DPI 330 transmits registration information of the corresponding terminal to the TMS 320. The registration information may include an identifier of the user terminal and/or a subscriber information identifier of the user terminal. The TMS 320 may use the registration information to register the corresponding user terminal as a target that may attach to the private network system 300 and perform lease processing on the user terminal.

The DPI 330 receives a packet including a service request of the user terminal from the EPC 310. The packet includes attachment information. The DPI 330 extracts the attachment information from the packet.

The DPI 330 may receive an attachment policy for the user terminal, which has requested a service, from the TMS 320. The DPI 330 may compare the extracted attachment information with the received attachment policy to control traffic of the corresponding user terminal.

The TMS 320 may receive the attachment policy from an administrator device 305. The attachment policy includes information for traffic control for a specific user or user terminal (hereinafter, described based on the user terminal). The attachment policy may include information on whether a specific user terminal is a blacklist target or a whitelist target. In addition, the attachment policy may specifically include a location (or area) for traffic control, a specific time (a day of the week, a specific time zone, etc.), and service classification information. The TMS 320 may manage the attachment policy and update the attachment policy according to information or commands transmitted from the administrator device 305.

The DPI 330 manages traffic for each subscriber (user) and/or each service for the user terminal. When the DPI 330 permits the service requested by the user terminal, the DPI 330 allows attachment to an Internet address providing the corresponding service via the intranet P through the switch SW or directly. When the DPI 330 blocks the service requested by the user terminal, the DPI 330 does not allow network attachment. When the DPI 330 controls traffic for a specific user terminal, the DPI 330 may transmit the corresponding control information to the TMS 320.

The TMS 320 may transmit the control information to the push server 340, and the push server 340 may push the control contents to the user terminal 10.

Figure 4:
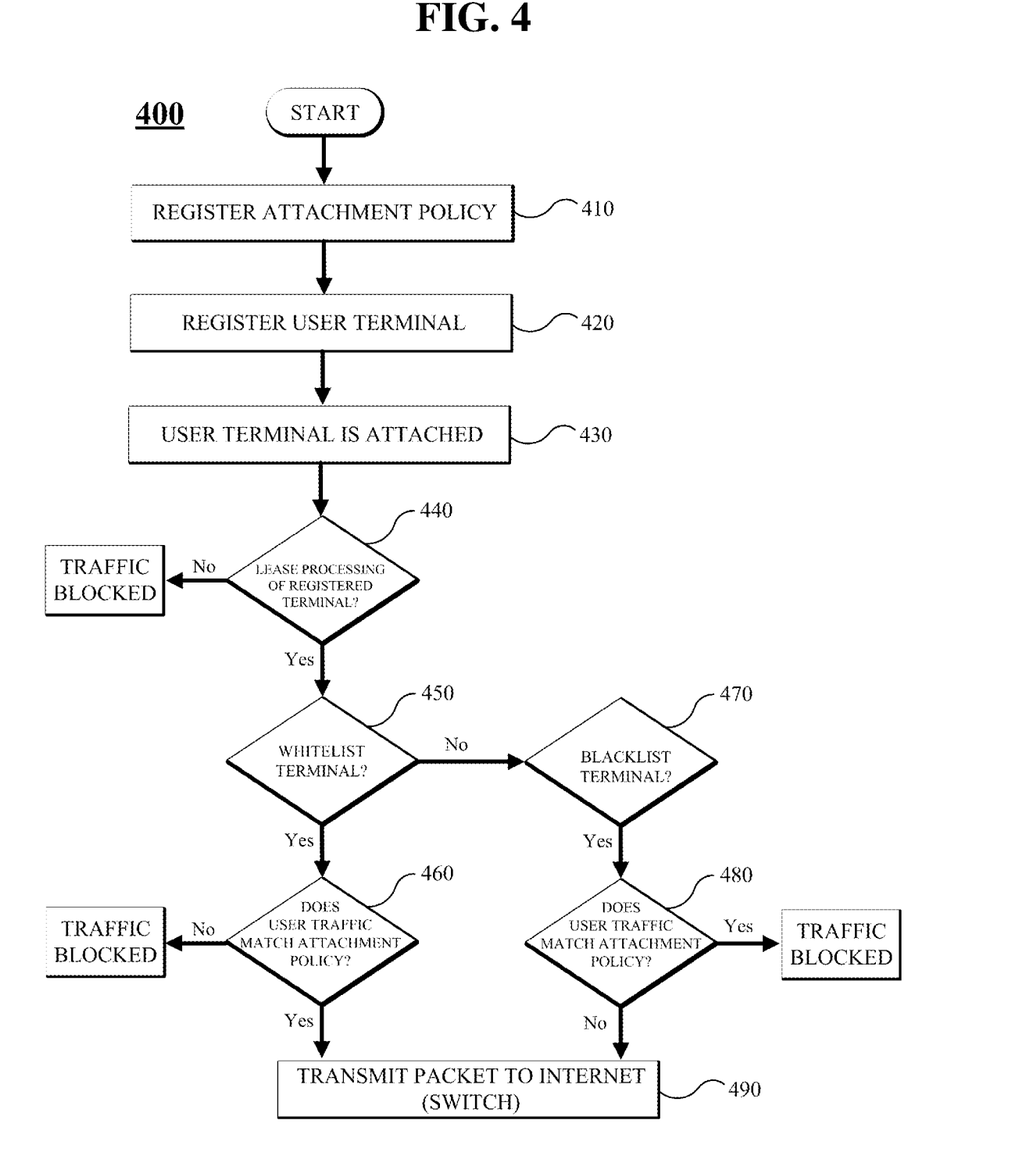
FIG. 4 is an example of a flowchart for a traffic control process in a private network system based on a mobile communication network.

FIG. 4 is an example of a flowchart for a traffic control process 400 in a private network system based on a mobile communication network.

The manager may attach to the TMS using an administrator device, such as a personal computer (PC), and register an attachment policy for traffic control in the TMS (410).

The attachment policy will be described. The attachment policy is applied only to a user terminal attached to the private network system. Therefore, the attachment policy is different from a PCRF policy of the mobile communication network.

The attachment policy may be classified into (i) area information, (ii) attachment time, and (iii) service identification information.

(1) In the attachment policy, the area information is information on an area in which the user terminal is located. The area information may be set to a specific building, a specific factory, a specific indoor area, a specific outdoor area, and the like. The area information may be defined as data, such as global positioning system (GPS) coordinates, connection or proximity to specific base station(s), and cells of a mobile communication network.

(2) The attachment time is the time at which the user terminal attaches to the network or requests a specific service. The attachment time may be defined as a specific time of the day, a specific day of the week, a specific month, a specific year, and the like.

(3) The service identification information is information that identifies a specific service provided by the private network. The specific service may be identified by an IP, an IP and a port number, a TCP port number, a UDP port number, an application name, a domain name, a host name, and the like.

The TMS registers a user terminal attached to the private EPC of the private network (420). The TMS leases a mobile station international subscriber directory number (MSISDN) of the attached user terminal in the mobile communication network, and registers an international mobile equipment identity (IMEI) of the terminal. The DPI controls only terminals registered as traffic control targets by the TMS.

In the registration process, the TMS may also set whether the user terminal is a whitelist-based control target or a blacklist-based control target. In addition, the TMS may individually set the attachment policy for the user terminal. That is, the TMS may set different attachment policies for each identifier of the corresponding terminal.

Thereafter, the user terminal attaches to the private network and requests a predetermined service (430). A user terminal that currently attaches to a private network and requests a service is referred to as a target terminal.

The DPI receives a packet including a service request of the target terminal from the private EPC. The DPI extracts required information from the received packet. The DPI may extract an identifier of the terminal, a location of the terminal, a service level of the terminal, and the like.

The DPI first checks whether the target terminal has been subject to lease processing as a registered terminal attachable to the private network system (440). The DPI blocks traffic when the target terminal is not a registered terminal. The DPI controls traffic according to a pre-set attachment policy when the target terminal is a registered terminal (Yes in operation 440).

The DPI controls the traffic of the target terminal with reference to the attachment policy of the TMS. The DPI checks whether the target terminal is a terminal belonging to the whitelist (450). When the target terminal is a whitelist-based terminal, the DPI allows only services for the registered policy. The DPI compares the attachment information of the target terminal with the attachment policy, and when the attachment information of the target terminal is the same as (matches) the attachment policy (Yes in operation 460), transmits the packet to the Internet (switch) (490). The DPI compares the attachment information of the target terminal with the attachment policy, and when the attachment information of the target terminal is not the same as (mismatches) the attachment policy, blocks the traffic.

The attachment information extracted by the DPI is information corresponding to the above-described attachment policy. The attachment information may include at least one of (i) a location of the terminal, (ii) an attachment time or service request time, and (iii) service identification information.

(1) The location of the terminal may be identified by using location information of RADIUS of the mobile communication network. When the location of the target terminal is included in the area information of the attachment policy, the DPI transmits the packet of the target terminal to the Internet.

(2) The attachment time is the time at which the target terminal attaches to the network (the mobile communication network or private network). The service request time is the time at which the target terminal requests a specific service, and may be the same as the attachment time, or may be a future point in time after the attachment time. When the attachment time of the target terminal is included in the attachment time allowed by the attachment policy, the DPI transmits the packet of the target terminal to the Internet.

(3) The service identification information is information for identifying a service. The service identification information may include at least one of an IP, an IP and a port number, a TCP port number, a UDP port number, an application name, a domain name, and a host name. When the identification information of the service requested by the target terminal is included in the service information allowed by the attachment policy, the DPI transits the packet of the target terminal to the Internet.

When the target terminal is not a whitelist-based terminal, the target terminal may be a terminal that is subject to blacklist-based control. When the target terminal is not a whitelist-based terminal (No in operation 450), the DPI may check whether the target terminal is a terminal belonging to the blacklist (470). When the target terminal is not a blacklist-based terminal, the DPI may check whether the target terminal is a registered terminal again.

When the target terminal is a blacklist-based terminal, the DPI blocks only services for the registered policy. The DPI compares the attachment information of the target terminal with the attachment policy, and when the attachment information of the target terminal is not the same as (mismatches) the attachment policy (No in operation 480), the DPI transmits the packet to the Internet (switch) (490). The DPI compares the attachment information of the target terminal with the attachment policy, and when the attachment information of the target terminal is not the same as (mismatches) the attachment policy, the DPI blocks the traffic.

The attachment information extracted by the DPI is information corresponding to the above-described attachment policy. The attachment information may include at least one of (i) a location of the terminal, (ii) an attachment time or service request time, and (iii) service identification information.

(1) The location of the terminal may be identified by using location information of RADIUS of the mobile communication network. The DPI blocks traffic when the location of the target terminal is included in the area information of the attachment policy.

(2) The attachment time is the time at which the target terminal attaches to the network (the mobile communication network or private network). The service request time is the time at which the target terminal requests a specific service, and may be the same as the attachment time, or may be a future point in time after the attachment time. The DPI blocks traffic when the attachment time of the target terminal is included in the attachment time allowed by the attachment policy.

(3) The service identification information is information for identifying a service. The service identification information may include at least one of an IP, an IP and a port numbers, a TCP port number, a UDP port number, an application name, a domain name, and a host name. The DPI blocks traffic when the identification information of the service requested by the target terminal is included in the service information allowed by the attachment policy.

Figure 5:
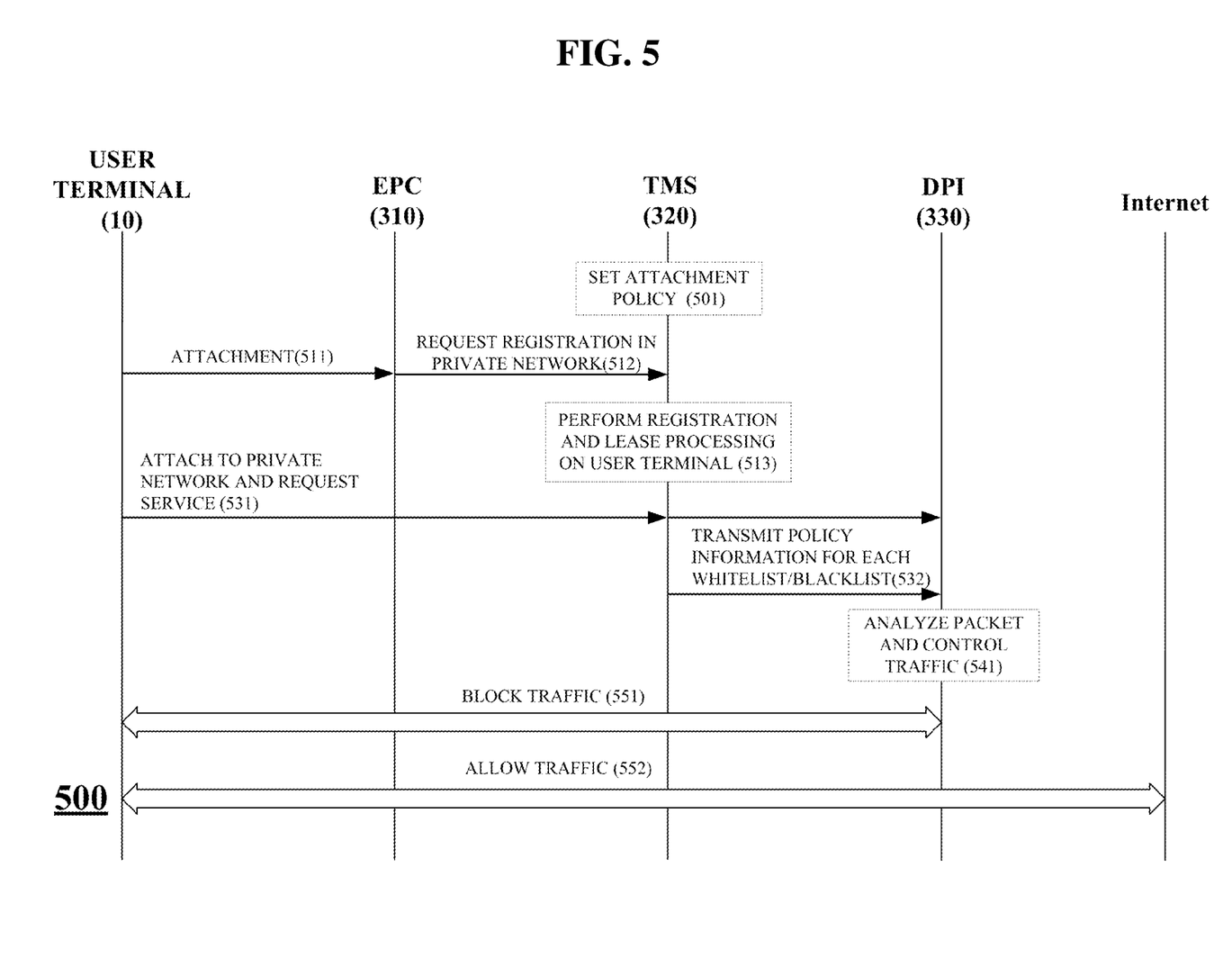
FIG. 5 is an example of a procedure flowchart for a traffic control process in a private network system based on a mobile communication network.

FIG. 5 is an example of a procedure flowchart for a traffic control process 500 in a private network system based on a mobile communication network.

The TMS 320 sets an attachment policy in advance (501). The attachment policy may be set based on the above-described various types of information (the area information, the attachment time, and the service identifier). The attachment policy may be set by a combination of various types of information (the area information, the attachment time, and the service identifier). In addition, the attachment policy may be set for each user terminal. The attachment policy may be set for each specific user group. The user group may be set in advance based on a subscription identifier of a terminal or an identifier of a terminal.

The user terminal 10 attaches to the private EPC 310 (511). When the user terminal 10 attaches to the private network for the first time, the user terminal 10 may request registration for use of the private network (512).

The TMS 320 performs registration and lease processing on the terminal requesting the registration (513).

Thereafter, the user terminal 10 requests a specific service while attaching to the private network (531). The TMS 320 transmits a blacklist-based and/or whitelist-based attachment policy to the DPI 330 (532). The TMS 320 may transmit the entire attachment policy to the DPI 330.

Although not shown, in some cases, the DPI 330 may analyze a packet to identify the user terminal, and transmit identification information of the user terminal to the TMS 320. In this case, the TMS 320 may transmit an attachment policy specified by the corresponding identifier to the DPI 330.

The packet of the user terminal 10 is delivered to the DPI 330. The DPI 330 may analyze the packet to extract attachment information. The DPI 330 compares the attachment information with the attachment policy to control traffic of the user terminal 10. The traffic control process is the same as described above.

When the user terminal 10 is a whitelist-based terminal, the DPI 330 permits only the services corresponding to the registered policy (552), and blocks other pieces of traffic (551). When the user terminal 10 is a blacklist-based terminal, the DPI 330 blocks only the services corresponding to the registered policy (551), and allows other pieces of traffic (552).

In addition, the above-described method of controlling traffic and operating method of a traffic control apparatus may be implemented as a program (or application) including an executable algorithm that can be executed in a computer. The program may be provided by being stored in a transitory or non-transitory computer readable medium.

A non-transitory readable medium is a medium that can store data semi-permanently and can be read by a device, rather than a medium that stores data for a short moment, such as a register, cache, or memory. Specifically, the above-described various applications or programs may be provided by being stored in a non-transitory readable medium, such as a compact disk (CD), a digital versatile disc (DVD), a hard disk, a Blu-ray disk, a Universal Serial Bus (USB), a memory card, a read-only memory (ROM), a programmable read only memory (PROM), an erasable PROM (EPROM), or an electrically erasable PROM (EEPROM), or a flash memory.

Transitory readable media refer to various RAMS, such as a Static RAM (SRAM), a Dynamic RAM (DRAM), a Synchronous DRAM (SDRAM), a Double Data Rate SDRAM (DDR SDRAM), ab Enhanced SDRAM (Enhanced) a Synchronous DRAM (Synclink DRAM, SLDRAM), and a Direct Rambus RAM (DRRAM).

As is apparent from the above, the above-described technology can allow attachment to a private network through a mobile communication network, but enables traffic control independent of the mobile communication network. Furthermore, the above-described technology enables effective traffic control in a private network that uses the configuration of a conventional mobile communication core network as an internal configuration of the private network.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling traffic in a private network based on a mobile communication network, the method comprising:
   when subscriber identification information of a user terminal is registered in a mobile communication core network, registering, by a traffic management device, an international mobile equipment identity (IMEI) of the user terminal to register the user terminal as a blacklist terminal or a whitelist terminal;
   attaching, by the user terminal, to the mobile communication core network;
   receiving, by a packet analysis device, a packet that requests network attachment for a specific service from a packet data processing system of the mobile communication core network, and extracting attachment information of the user terminal from the packet; and
   comparing, by the packet analysis device, the attachment information with an attachment policy of the traffic management device that is set in advance to control intranet or Internet attachment,
   wherein the packet data processing system, the packet analysis device, and the traffic management device are included in a private network system which is an independent network system that is not controlled by a control policy device of the mobile communication core network.

2. The method of claim 1, further comprising receiving, by the traffic management device, the attachment policy for traffic control of the user terminal from an administrator device.

3. The method of 1, wherein the attachment information includes location information extracted from authentication information generated when the user terminal attaches to the mobile communication core network, and
   the traffic control device determines whether a location of the user terminal specified based on a location of at least one base station is provided within a specific area of the attachment policy, and controls the attachment.

4. The method of claim 1, wherein the attachment information includes a time of requesting the network attachment, and
   the traffic control device determines whether the time is included in a specific day of a week or a specific time of a day of the attachment policy and controls the attachment.

5. The method of claim 1, wherein the attachment information is service information requested through the network attachment,
   the service information includes at least one of an internet protocol (IP), an IP and a port number, a transmission control protocol (TCP) or a user datagram protocol (UDP) port number, a host name, a domain name, and an application name, and
   the traffic control device determines whether the service information matches a service target of the attachment policy to control the attachment.

6. A private network system based on a mobile communication network, the private network system comprising:
   a packet data processing system of a mobile communication core network to which a user terminal is attached;
   a traffic management device configured to retain an attachment policy that is set in advance; and
   a packet analysis device configured to receive a packet that requests network attachment from the packet data processing system, extract attachment information of the user terminal from the packet, and compare the attachment information with the attachment policy of the traffic management device to control intranet or Internet attachment,
   wherein the attachment policy includes at least one of a whitelist defining a target whose traffic is allowed or a blacklist defining a target whose traffic is blocked, and
   the packet data processing system is included in a private network system that is not controlled by a control policy device of the mobile communication core network.

7. The private network system of claim 6, further comprising a administrator device configured to generate the attachment policy and transmit the generated attachment policy to the traffic management device.

8. The private network system of claim 6, wherein the attachment information includes location information extracted from authentication information generated when the user terminal attaches to the mobile communication core network, and
   the traffic control device is configured to determine whether a location of the user terminal specified based on a location of at least one base station is provided within a specific area of the attachment policy, and control the attachment.

9. The private network system of claim 6, wherein the attachment information includes a time of requesting the network attachment, and
   the traffic control device is configured to determine whether the time is included in a specific day of a week or a specific time of a day of the attachment policy and control the attachment.

10. The private network system of claim 6, wherein the attachment information is service information requested through the network attachment,
    the service information includes at least one of an internet protocol (IP), an IP and a port number, a transmission control protocol (TCP) or user datagram protocol (UDP) port number, a host name, a domain name, and an application name, and the traffic control device is configured to determine whether the service information matches a service target of the attachment policy to control the attachment.

11. The private network system of claim 6, wherein the attachment information includes an international mobile equipment identity (IMEI) of the user terminal, the attachment policy includes the IMEI of the user terminal that is registered in response to subscriber identification information of the user terminal being registered in the mobile communication network, and when the IMEI of the user terminal is not included in information registered in the attachment policy, the packet analysis device is configured to block traffic of the user terminal.

12. The private network system of claim 6, wherein the packet analysis device is configured to, when the user terminal is a terminal belonging to the whitelist, allow only a service included in the attachment policy to be provided to the user terminal, and when the user terminal is a terminal belonging to the blacklist, block only a service included in the attachment policy from being provided to the user terminal.

* * * * *